(12) United States Patent
Wijayanathan (10) Patent No.: US 8,514,754 B2
(45) Date of Patent: Aug. 20, 2013

(54) METHODS AND APPARATUS FOR USE IN CONTROLLING DISCONTINUOUS TRANSMISSION (DTX) FOR VOICE COMMUNICATIONS IN A NETWORK

(75) Inventor: Maiyuran Wijayanathan, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1339 days.

(21) Appl. No.: 11/931,444

(22) Filed: Oct. 31, 2007

(65) Prior Publication Data

US 2009/0109942 A1   Apr. 30, 2009

(51) Int. Cl.
*H04B 7/00* (2006.01)
*H04B 7/185* (2006.01)
*H04W 4/00* (2009.01)
*H04L 12/28* (2006.01)

(52) U.S. Cl.
USPC ......... 370/310; 370/317; 370/338; 370/395.2

(58) Field of Classification Search
USPC ................ 370/310–311, 317–318, 395.2
See application file for complete search history.

(56) References Cited

U.S. PATENT DOCUMENTS

| | | | |
|---|---|---|---|
| 2002/0058495 A1* | 5/2002 | Chow et al. | 455/406 |
| 2004/0213195 A1 | 10/2004 | Islam et al. | |
| 2006/0171419 A1 | 8/2006 | Spindola et al. | |
| 2006/0293885 A1 | 12/2006 | Gournay et al. | |
| 2007/0058609 A1 | 3/2007 | Goel et al. | |
| 2008/0008298 A1* | 1/2008 | Kirla | 379/88.03 |

FOREIGN PATENT DOCUMENTS

| | | |
|---|---|---|
| EP | 1566066 B1 | 1/2007 |
| WO | 2006056070 A1 | 6/2006 |
| WO | 2006136901 A2 | 12/2006 |
| WO | 2007034037 A1 | 3/2007 |
| WO | 2007063380 A2 | 6/2007 |
| WO | 2007096685 A1 | 8/2007 |

OTHER PUBLICATIONS

International Search Report, PCT/CA2008/001910, Oct. 30, 2008.
Written Opinion, PCT/CA2008/001910, Oct. 30, 2008.

(Continued)

*Primary Examiner* — Brandon Renner
(74) *Attorney, Agent, or Firm* — John J. Oskorep, Esq. LLC (57) ABSTRACT

In one illustrative example, a mobile communication device receives, via a generic access network (GAN) from a GAN controller, a message having a discontinuous transmission (DTX) indication. For a voice communication session, the mobile device causes a connection to be established with the GANC, via the GAN and over a wireless communication link with a wireless access point of the GAN, for the communication of voice data of the voice session which is provided via a core network of a mobile telecommunications network. In response to identifying that the DTX indication indicates that the DTX functions are instructed or supported by the GANC, the mobile device causes DTX functions to be performed for the communication of the voice data of the voice session over the wireless link. On the other hand, in response to identifying that the DTX indication fails to indicate that DTX functions are supported or instructed by the GANC, the mobile device refrains from causing the DTX functions to be performed for the communication of the voice data of the voice session over the wireless link. Preferably, the message which carries the DTX indication is a GA-RC REGISTER ACCEPT message or a GA-RC REGISTER UPDATE DOWNLINK message.

24 Claims, 6 Drawing Sheets

(56) References Cited

OTHER PUBLICATIONS

International Preliminary Report on Patentability, PCT application # PCT/CA2008/001910, Oct. 30, 2008.

Shiao-Li Tsao, Research Challenges and Perspectives of Voice over Wireless LAN, IEEE, 2005.
Extended European Search Report—European Patent Application No. 08151378.0—Jul. 1, 2008.

* cited by examiner

METHODS AND APPARATUS FOR USE IN CONTROLLING DISCONTINUOUS TRANSMISSION (DTX) FOR VOICE COMMUNICATIONS IN A NETWORK

BACKGROUND

1. Field of the Technology

The present disclosure relates to methods and apparatus for controlling discontinuous transmission (DTX) operations in a generic access network (GAN), preferably for mobile communication devices adapted to operate in both wireless local area networks (WLANs) (e.g. IEEE 802.11-based networks) and wireless wide area networks (WWANs) (e.g. public land mobile networks or PLMNs), where communication services of a core network of a PLMN are accessible to the mobile devices via the WLAN in a GAN mode of operation through a GAN controller (GANC).

2. Description of the Related Art

Discontinuous transmission (DTX) for mobile devices operating in wireless wide area networks (WWANs), such as cellular telecommunication networks (e.g. GSM/GPRS based networks), are known. During a voice call, a mobile device maintains a radio link with a base station of a public land mobile network (PLMN) with use of a radio transmitter. During DTX, the radio transmitter is switched off most of the time during speech pauses during the voice call, thereby saving power in the mobile device and reducing the overall interference level over the air interface. A DTX mechanism on the transmit side (e.g. at the mobile device) may have a voice activity detector and a background acoustic noise evaluator. When little or no voice activity is detected on the transmit side, the radio transmitter is switched off after parameters representing background acoustic noise have been sent. On the receive side (e.g. at a base station controller or BSC of the PLMN), the DTX mechanism includes a comfort noise generator which produces "comfort noise" for the listener based on the received parameters. In a Global System for Mobile communications (GSM)/General Packet Radio Service (GPRS) based network, DTX operations are typically performed by the mobile device for uplink communications if commanded so by the network in a System Information Type 3 or Type 6 message. For downlink communications, the mobile device is typically required to handle DTX operations at any time, regardless of whether DTX for uplink communications are commanded so by the network.

Recently, communication services of a PLMN have been made accessible to mobile devices via a GAN (e.g. a WLAN or IEEE 802.11 based network) with use of a GAN controller (GANC) which is connected to a core network of the PLMN. For example, a mobile device may establish a wireless communication link with a wireless access point of any suitable WLAN (in contrast to a base station of the PLMN) available in its coverage area, but utilize voice communication services provided via the core network of the PLMN via the GANC. Thus, radio coverage for obtaining communication services associated with the PLMN may be provided or extended through use of WLANs in locations where PLMN radio coverage would not be economical or technically feasible. Such locations may be large residential areas with a small number of inhabitants. Of course, communication services associated with the PLMN may also be provided via WLANs that are already widely deployed to extend radio coverage.

Current GAN architecture, however, fails to support DTX. When a mobile device operates in the GAN mode of operation via a wireless communication link with a wireless access point of a WLAN, for example, the mobile device has increased power consumption and increases the interference level over the air interface.

Accordingly, what are needed are methods and apparatus for controlling DTX operations in a GAN.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Methods and apparatus for controlling discontinuous transmission operations in a generic access network (GAN) are described herein. In one illustrative embodiment, a mobile communication device receives, via the GAN from a GAN controller, a message having a discontinuous transmission (DTX) indication. For a voice communication session, the mobile device causes a connection to be established with the GANC, via the GAN and over a wireless communication link with a wireless access point of the GAN, for the communication of voice data of the voice session which is provided via a core network of a mobile telecommunications network. In response to identifying that the DTX indication indicates that the DTX functions are instructed or supported by the GANC, the mobile device causes DTX functions to be performed for the communication of the voice data of the voice session over the wireless link. On the other hand, in response to identifying that the DTX indication fails to indicate that DTX functions are supported or instructed by the GANC, the mobile device refrains from causing the DTX functions to be performed for the communication of the voice data of the voice session over the wireless link. Preferably, the message which carries the DTX indication is a GA-RC REGISTER ACCEPT message or a GA-RC REGISTER UPDATE DOWNLINK message.

A corresponding technique of the present disclosure relates to operations at the GAN controller (GANC). The GANC causes a message having a DTX indication to be produced and sent to a mobile communication device via a GAN. The GANC also causes a connection to be established with the mobile communication device, via the GAN and over a wireless communication link between the mobile communication device and a wireless access point of the GAN, for the communication of voice data of a voice communication session for the mobile communication device which is provided via a core network of a PLMN which communicates with the GANC. The DTX indication may be defined to indicate one of two different instructions or preferences: that the mobile communication device is to perform the DTX functions for the communication of the voice data over the wireless link with the wireless access point, or that the mobile communication is to refrain from performing the DTX functions for the communication of the voice data over the wireless link with the wireless access point. For DTX, the GANC may operate to receive and identify parameters in the communication of the voice data and to produce comfort noise on the receiving end based on the received parameters.

Figure 1:
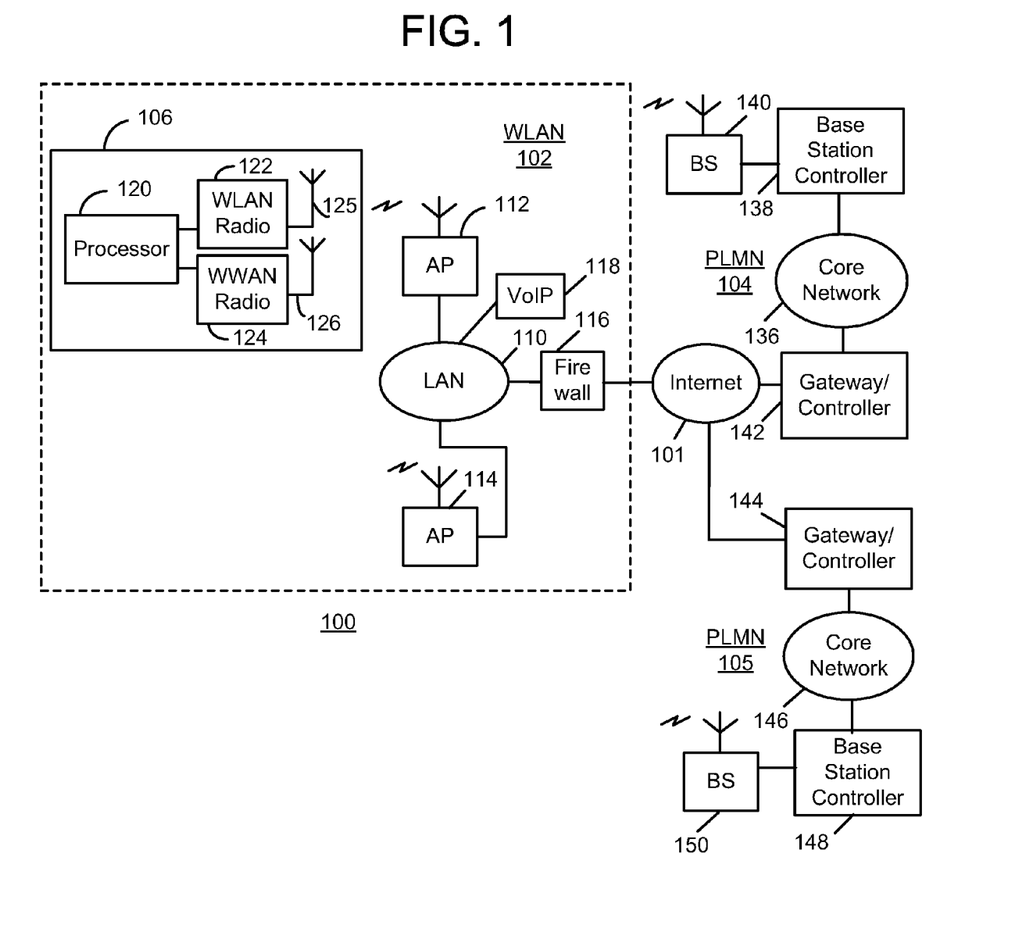
FIG. 1 is an illustrative representation of a communication system which includes a wireless local area network (WLAN) (such as an IEEE 802.11-based wireless network, which is a significant part of one type of Generic Access Network or GAN) and a wireless wide area network (WWAN)

To help further illustrate, FIG. 1 is an illustrative representation of a communication system 100 which includes a wireless local area network (WLAN) 102 and a public land mobile network (PLMN) 104. WLAN 102 is a significant part of one type of Generic Access Network (GAN). Using one or more base stations and base station controllers, PLMN 104 may be or be referred to as a wireless wide area network (WWAN) or a mobile telecommunications network.

In the embodiment described, WLAN 102 is an IEEE 802.11-based wireless network. WLAN 102 may be part of a communication network such as a local area network (LAN) 110. In this embodiment, LAN 110 is part of a private communication network which may be referred to as an enterprise network of an enterprise having a gateway 116 which may include a firewall. Terminals may connect to LAN 110 through any suitable means, such as through a plurality of wireless access points (APs) (e.g. APs 112 and 114) of WLAN 102. Such mobile communication devices and wireless APs operate in accordance with well-known IEEE 802.11 standards.

LAN 110 which includes WLAN 102 provides various data and communication services to its terminals. For example, LAN 110 may provide for voice telephony communication services for its terminals with use of Voice over IP (VoIP) communications. For such services, LAN 110 may utilize servers such as a VoIP type server 118 or at least one session server which is a session initiation protocol (SIP) server. Communication applications, such VoIP applications, may require the use of SIP. SIP is well-documented in standard documents such as Request For Comments (RFC) 3261.

PLMN 104 includes a core network 136, a plurality of base station controllers such as a base station controller (BSC) 138 coupled to core network 136, and a plurality of base stations such as a base station (BS) 140 coupled to associated BSCs 138. Core network 136, BSC 138, and BS 140 operate in a conventional fashion as well-documented. Other PLMNs in the environment have a similar or the same architecture as PLMN 104, such as a PLMN 105 having a core network 146, a plurality of base station controllers such as a base station controller (BSC) 148, a plurality of base stations such as a base station (BS) 150 coupled to associated BSCs 148, and a gateway/controller 144 provided between the Internet 101 and core network 146.

In this example, a communication device 106 of LAN 110 which is shown as a mobile communication device/wireless handset (WH) of the dual-mode type, having both WLAN and WWAN radio interfaces. In particular, communication device 106 is shown to have one or more processors 120, a WLAN radio interface 122, a WWAN radio interface 124, and antenna components 125 and 126 coupled to radio interfaces 122 and 124. Thus, communication device 106 may access services of core network 136 of PLMN 104 with use of WWAN radio interface 124, as well as access services of LAN 110 with use of WLAN radio interface 122.

Communications between LAN 110 and core network 136 of PLMN 104 may be facilitated through a suitable connecting network such as a broadband, wide-area IP communication network (e.g. the Internet 101) or any suitable public or private wide area network. Gateway/controller 142 is provided between the Internet 101 and core network 136 of PLMN 104 in order to facilitate access to core network 136 by terminals through alternative links (e.g. radio links wireless APs 112 and 114) different than those conventional radio links offered in the PLMN 104 (e.g. radio links of base station 140). Thus, communication device 106 may also access services of core network 136 of PLMN 104 via WLANs, such as WLAN 102, through use of WLAN radio interface 122. For such communications, gateway/controller 142 and communication device 106 are adapted to establish and maintain a (secure) tunnel connection between each other through the intervening networks. Note that WLAN 102 may be operator-controlled or provided (e.g. controlled or provided by the operator associated with PLMN 104), user-controlled or provided (e.g. controlled or provided by the end user of communication device 106), or third-party-controlled or provided.

Preferably, gateways/controllers 142/144 operate in accordance with Generic Access Network (GAN) based technology (formerly known as Unlicensed Mobile Access (UMA), and may be or include a GAN Controller (GANC) (formerly known as UMA Network Controller or UNC) or the like. In this case, terminals including communication device 106 are enabled with GAN technology for operating in a GAN mode of operation.

GAN methodologies are known and described in publicly available documentation. Communication device 106 with GAN-enabled, dual-mode operation (e.g. communication device 106) may be within operating range of WLAN 102 for communications. Upon connecting, communication device 106 contacts gateway/controller 142 (e.g. the GANC), via WLAN 102 and the Internet 101, to be authenticated and authorized to access voice and data communication services of core network of PLMN 104. If approved, the subscriber's current location information is stored in core network 136 of PLMN 104 and, from that point on, all voice and data traffic for communication device 106 is routed to the device via WLAN 102, in contrast to a radio access network (RAN) of PLMN 104 which includes BSC 138 and BS 140. In this state, communication device 106 is operating in a GAN mode of operation. When a call is established for communication device 106 while operating within WLAN 102, the call connection for the call is routed within core network 136 but RF resources of WLAN 102 are utilized. When communication device 106 moves outside the range of WLAN 102, communication device 106 and gateway/controller 142 help facilitate a roaming to the licensed outdoor network (e.g. the RAN of PLMN 104). When camping on the RAN of PLMN 104, communication device 106 is operating in a WWAN mode of operation.

In this embodiment specifically, WLAN 102 is operable as a broadband IP-based access network providing access to the well-known A/Gb interfaces of PLMN 104, wherein gateway/controller 142 is a network node coupled to WLAN 102 via an Up reference point interface. See e.g. Third Generation Partnership Project (3GPP) Technical Specification (TS) 43.318. As provided for in such specification documents, the Up reference point defines the interface between gateway/controller 142 and communication device 106. Where the WLAN 102 and gateway/controller 142 are operable to co-exist with the GSM/Enhanced Data Rates for GSM Evolution (EDGE) RAN (GERAN) infrastructure, gateway/controller 142 interconnects to the core network 136 of PLMN 104 via the same A/Gb interfaces used by a standard GERAN Base Station Subsystem (BSS) network element. Accordingly, the functionality of gateway/controller 142 includes necessary protocol interworking so as to emulate the functionality of the GERAN BSS. An A-interface defines the interface for GSM-based circuit-switched (CS) services and is disposed between gateway/controller 142 and a Mobile Switching Center (MSC) of PLMN 104. A Gb-interface defines the interface for GPRS-based packet-switched (PS) services and is disposed between gateway/controller 142 and Serving GPRS Support Node (SGSN) (not shown in FIG. 1) of PLMN 104. A Security Gateway (SGW) 311 may also be included in GANC 304 that is interfaced via a Wm reference point with an Authentication, Authorization and Accounting (AAA) proxy/server node disposed in PLMN 104, wherein a Home Location Register (HLR) is operably coupled to AAA node.

In operation, WLAN 102 and gateway/controller 142 appears to core network 136 of PLMN 104 as a GERAN BSS network element by mimicking the role of the BSC in the GERAN architecture as seen from the perspective of the A/Gb interfaces. Accordingly, transparency exists between core network 136 of PLMN 104 and the underlying radio access technologies supported by gateway/controller 142, which are different from the radio access supported by BSC 138. As described earlier, WLAN 102 is disposed between generic access (GA)-enabled communication device 106 and gateway/controller 142 may be effectuated by a suitable broadband IP network 101. The overall functionality provided by gateway/controller 142 includes user plane circuit-switched (CS) services, user plane packet-switched (PS) services, and control plane functionality. User plane CS services typically involve interworking CS bearers over the Up interface to CS bearers over the A-interface, including appropriate transcoding of voice to/from UE and PCM voice from/to the MSC. The user plane PS services typically involve interworking data transport channels over the Up interface to packet flows over the Gb interface. The control plane functionality typically includes (i) SGW for the set-up of secure tunnel with UE for mutual authentication, encryption and data integrity; (ii) registration for GAN service access and providing system information; (iii) set-up of GAN bearer paths for CS and PS services (e.g. establishment, management, and teardown of signaling and user plane bearers between communication device 106 the gateway/controller 142); and (iv) GAN functional equivalents to GSM paging and handovers.

Note that the description of the architecture for FIG. 1 relates to a specific example where the WLAN is an IEEE 802.11-based network and the WWAN is a cellular telecommunications network. The WLAN and WWAN may be networks different from those networks, however, where, for example, the WLAN network covers a smaller region relative to the WWAN network. Specifically, the WLAN may be a Bluetooth-based network, a WiMAX-based network (i.e. IEEE 802.16), or a Ultra-WideBand (UWB)-based network (i.e. IEEE 802.15), as a few examples. WWAN networks may be, as examples, a Long-Term Evolution (LTE)-based network or an EVolution-Data Only (EV-DO)-based network.

Note that current GAN architecture fails to support discontinuous transmission (DTX). When a mobile device operates in a GAN mode of operation via a wireless communication link with a wireless access point of a WLAN, for example, the mobile device has increased power consumption and increases the interference level over the air interface.

Figure 2:
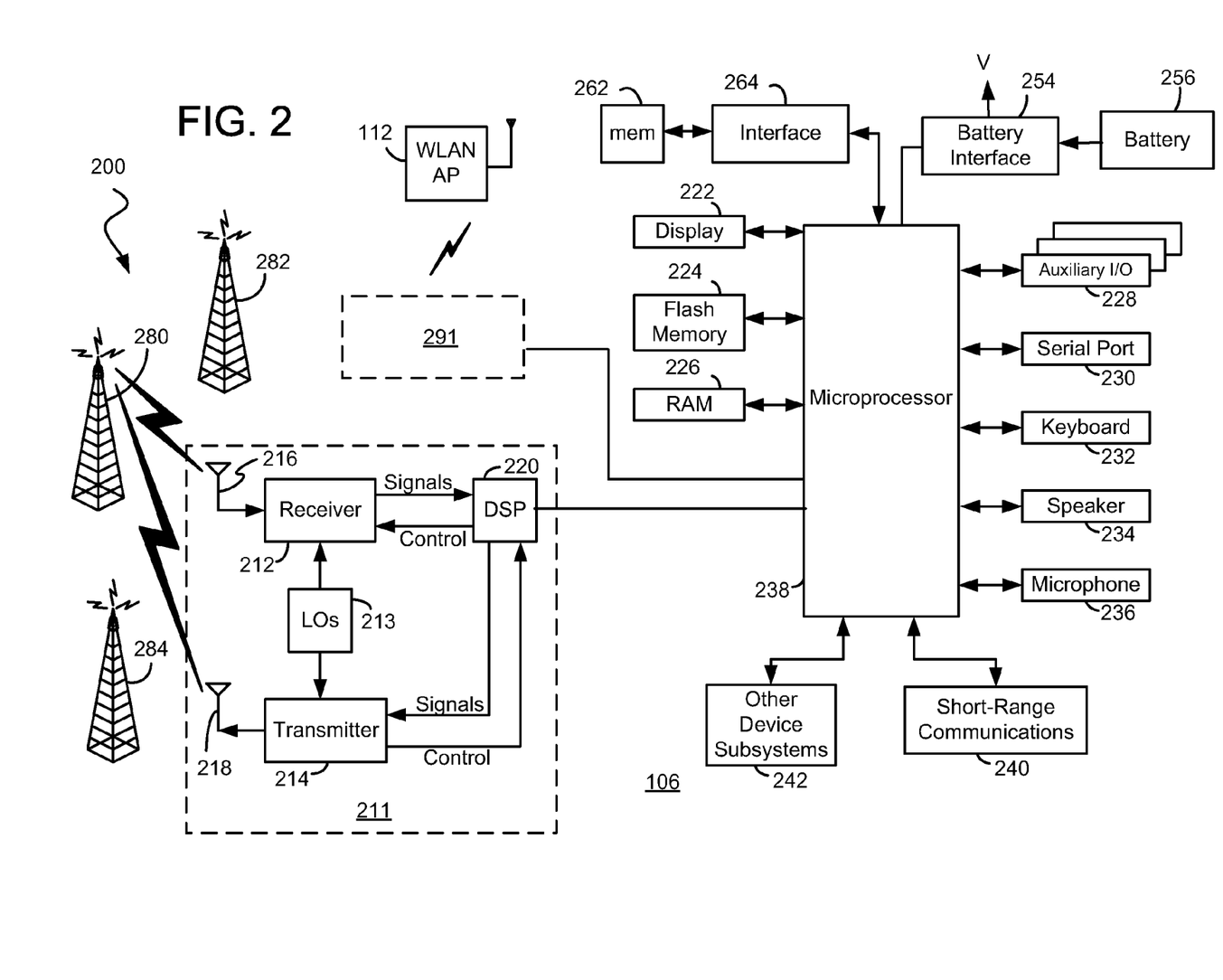
FIG. 2 is a schematic diagram of a mobile communication device (e.g. a handheld wireless handset) which may operate in both the WLAN and the WWAN of FIG. 1.

Referring now to FIG. 2, electrical components of a typical mobile communication device 106 (e.g. a wireless handheld device) of the present disclosure which is adapted to operate in a wireless network environment which includes both WLANs (represented in FIG. 2 by AP 112) and WWANs (represented in FIG. 2 by cellular base stations 200 which include stations 280, 282, and 284) are now described. Mobile device 106 may be representative of one or more terminals which operate in communication system 100 of FIG. 1. Mobile device 106 is preferably a two-way communication device having at least voice and advanced data communication capabilities, including the capability to communicate with other computer systems. Depending on the functionality provided by mobile device 106, it may be referred to as a data messaging device, a two-way pager, a cellular telephone with data messaging capabilities, a wireless Internet appliance, or a data communication device (with or without telephony capabilities).

As shown in FIG. 2, mobile device 106 is adapted to wirelessly communicate with cellular base stations 200. For communication with cellular base stations 200, mobile device 106 utilizes a communication subsystem 211 which includes RF transceiver circuitry. Communication subsystem 211 includes a receiver 212, a transmitter 214, and associated components, such as one or more (preferably embedded or internal) antenna elements 216 and 218, local oscillators (LOs) 213, and a digital signal processor (DSP) 220. As will be apparent to those skilled in the field of communications, the specific design of communication subsystem 211 depends on the communication network in which mobile device 106 is intended to operate. In the present application, communication subsystem 211 (including its associated processor/processing components) are operative in accordance with a cellular or other suitable WWAN standards (i.e. a standard other than IEEE 802.11), such as GSM/GPRS standards.

Mobile device 106 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These processed signals are input to transmitter 214 for digital-to-analog (D/A) conversion, frequency up conversion, filtering, amplification and transmission through the network via antenna 218. DSP 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Mobile device 106 also has a communication subsystem 291 which includes RF transceiver circuitry operative in accordance with a suitable WLAN standard, such as the IEEE 802.11 standard, for communications with WLANs (e.g. represented by AP 112 in FIG. 2). Communication subsystem 291 is similar in structure and functionality to communication subsystem 211, where DSP 220 may be replaced with a processing module referred to as a baseband (BB) and media access control (MAC) module. Although mobile device 106 may have separate and independent subsystems for these purposes, at least some portions or components of these otherwise different subsystems may be shared where possible. Communication subsystem 291 may be referred to as a Generic Access Network (GAN) module or controller. As mobile device 106 operates in accordance with both a cellular network interface standard (e.g. GSM/GPRS standard) and the IEEE 802.11 standard, it may be referred to as a "dual mode" mobile device.

Since mobile device 106 may be a handheld, portable, battery-powered device, it also includes a battery interface 254 for receiving one or more rechargeable batteries 256. Such a battery 256 provides electrical power to most if not all electrical circuitry in mobile device 106, and battery interface 254 provides for a mechanical and electrical connection for it. Battery interface 254 is coupled to a regulator (not shown in FIG. 2) that provides a regulated voltage V to all of the circuitry.

Mobile device 106 includes a microprocessor 238 (one type of processor or controller) that controls overall operation of mobile device 106. This control includes the DTX control techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 106. A predetermined set of applications that control basic device operations, including at least data and voice communication applications, will normally be programmed and/or installed on mobile device 106 during its manufacture (e.g. the DTX control techniques of the present disclosure). A preferred application that may be loaded onto mobile device 106 may be a personal information manager (PIM) application having the ability to organize and manage data items relating to user such as, but not limited to, e-mail, calendar events, voice mails, appointments, and task items. Naturally, one or more memory stores are available on mobile device 106, and memory 262 (designed as "mem" in FIG. 2) such as a subscriber identity module (SIM) or the like coupled via an interface 264 is used to facilitate storage of PIM data items and other user information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on mobile device 106 with respect to such items. This is especially advantageous where the host computer system is the wireless device user's office computer system. Additional applications may also be loaded onto mobile device 106 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 106 and may provide enhanced on-device functions, communication-related functions, or both. For example, secure communication applications may enable electronic commerce functions and other such financial transactions to be performed using mobile device 106.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 106 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile device 106 is substantially similar, except that the received signals would be output to speaker 234 and signals for transmission would be generated by microphone 236. Alternative voice or audio I/O subsystems, such as a voice message recording subsystem, may also be implemented on mobile device 106. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 106 by providing for information or software downloads to mobile device 106 other than through a wireless communication network. The alternate download path may, for example, be used to load an encryption key onto mobile device 106 through a direct and thus reliable and trusted connection to thereby provide secure device communication. Short-range communications subsystem 240 of FIG. 2 is an additional optional component that provides for communication between mobile device 106 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile device 106 has just been described, any suitable mobile communication device or terminal may be part of the inventive methods and apparatus which will be described in fuller detail below.

Figure 3:
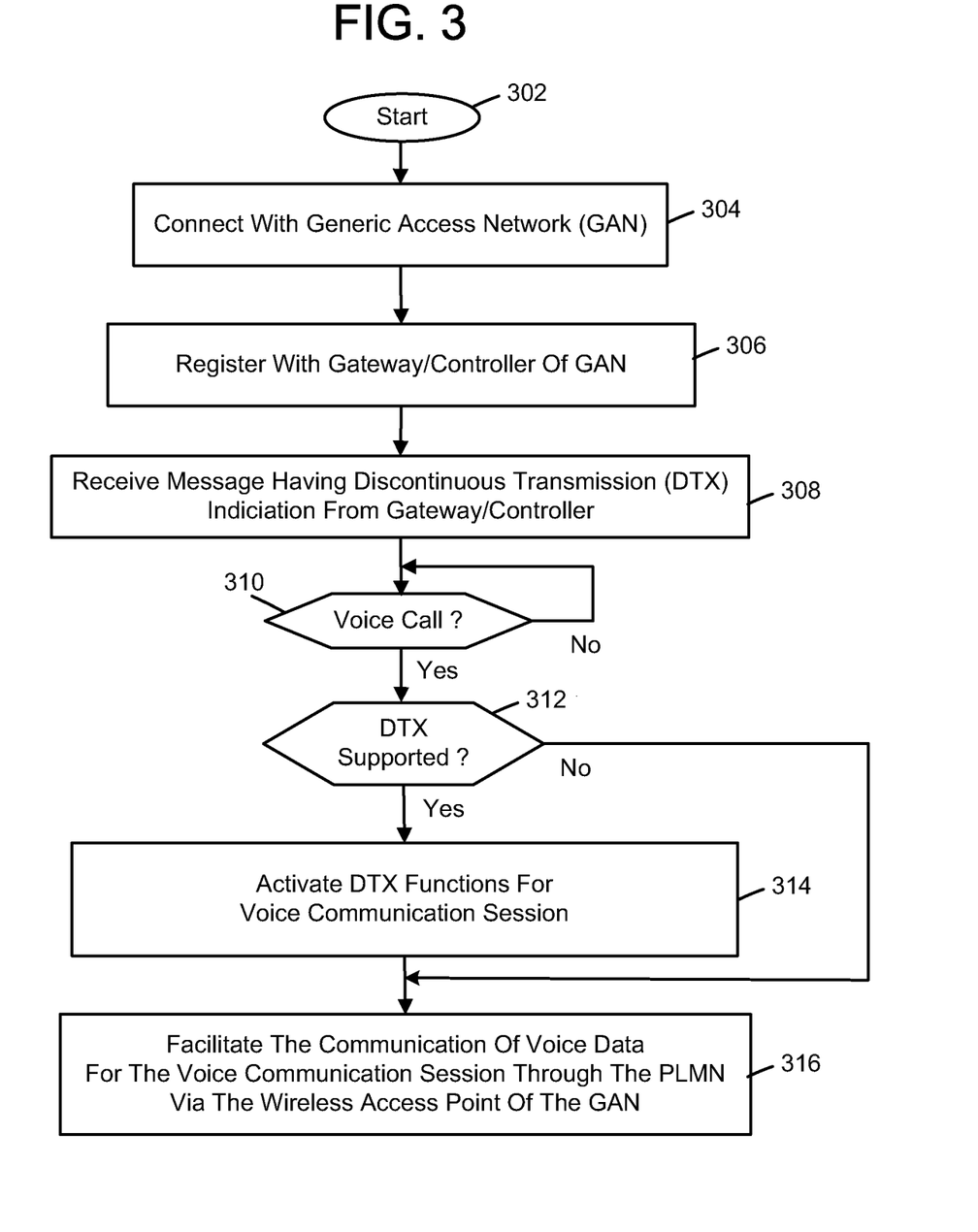
FIG. 3 is a flowchart which describes a method of controlling discontinuous transmission (DTX) operations in the environment of FIG. 1.

FIG. 3 is a flowchart which describes a method of controlling the selection of communication of networks by a mobile communication device, such as mobile communication device 106 in the environment of FIG. 1. As apparent, the embodiments of the present disclosure are directed to a specific example where the WLAN is an IEEE 802.11-based network and the WWAN is a cellular telecommunications network or PLMN. Again, however, the WLAN and WWAN may be networks different from those networks, where, for example, the WLAN network covers a smaller region relative to the WWAN network. Specifically, the WLAN may be a Bluetooth-based network, a WiMAX-based network (i.e. IEEE 802.16), or a Ultra-WideBand (UWB)-based network (i.e. IEEE 802.15), as a few examples. WWAN networks may be, for example, a Long-Term Evolution (LTE)-based network or a EVolution-Data Only (EV-DO)-based network. Further, the example indicates that the communication device is a mobile communication device of the dual-mode type, having both WLAN and WWAN radio interfaces. In an alternative embodiment, however, mobile communication device 106 may have only a single (radio) interface for access (e.g. only WLAN radio interface 122) and operates accordingly without the other interface. The technique may be embodied in a mobile communication device having one or more processors, a WLAN (radio) interface adapted to communicate via the WLAN, and a WWAN or PLMN (radio) interface adapted to communicate via the WWAN. The technique may also be embodied in a computer program product which includes a computer readable medium and computer instructions stored in the computer readable medium which execute the method.

Figure 4:
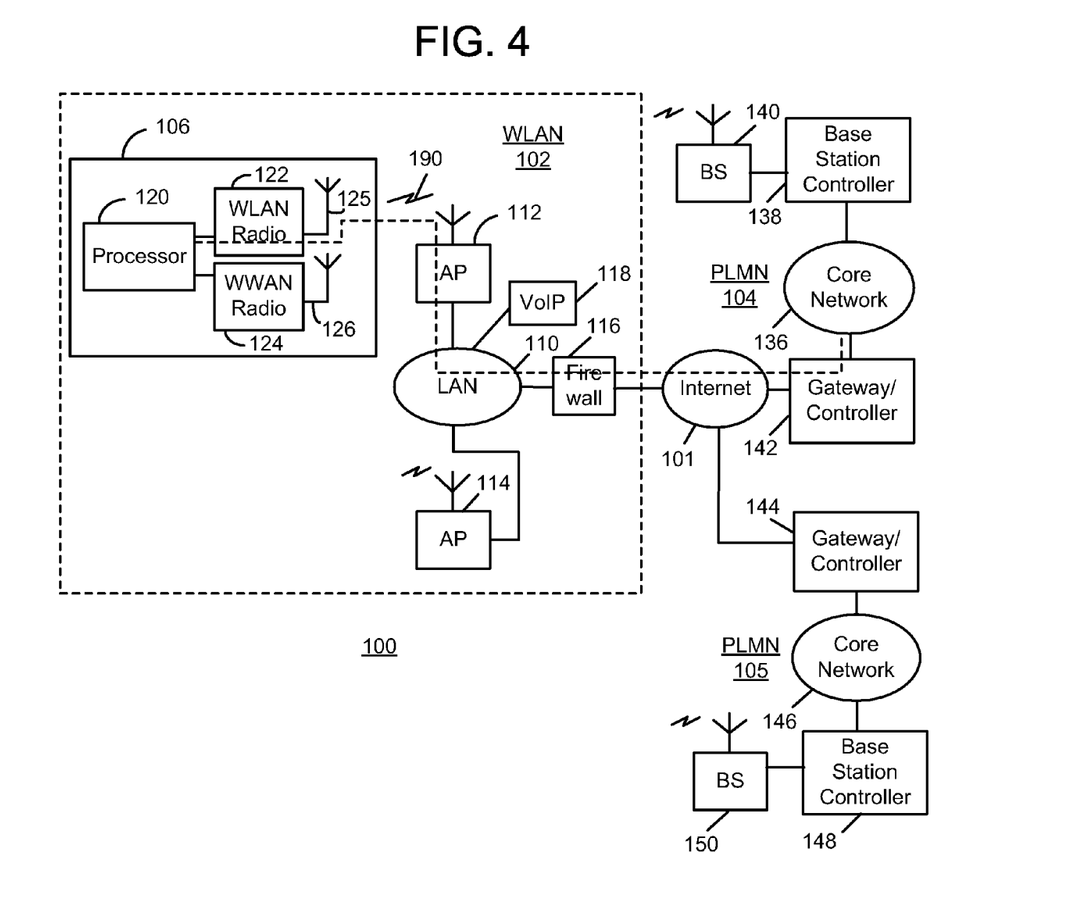
FIG. 4 is an illustration of the communication system of FIG. 1, where a connection is established and maintained, via the WLAN using a WLAN radio interface, with a GAN controller (GANC) for a voice communication session maintained through a core network of a PLMN.

Beginning at a start block 302 of FIG. 3 in combination with FIG. 4, mobile device 106 operates its WLAN radio interface 122 to establish and maintain a connection with WLAN 102 (e.g. the GAN) through wireless AP 112 (step 304 of FIG. 3). Passive or active scanning for WLANs may be performed prior to making such connection. For scanning, mobile device 106 may have access to a user profile including a preferred and/or prioritized list of WLAN identifications maintained in its memory for selecting/identifying the most preferred WLAN available in its current location or geographic coverage region for network access.

Next, mobile device 106 operates to register with gateway/controller 142 for obtaining communication services provided by a core network of a PLMN (e.g. core network 136 of PLMN 104) (step 306 of FIG. 3). The communication services made available by core network 136 of PLMN 104 may be or include communication services such as voice, data, electronic mail (e-mail), Web browsing, etc. In order to select/identify the appropriate gateway/controller or PLMN for registration (e.g. gateway/controller 142 of PLMN 104 or gateway/controller 144 of PLMN 105), mobile device 106 may have access to a preferred and/or prioritized list of networks maintained in its memory for use in selecting the most preferred available network when a home PLMN and/or service(s) thereof are unavailable. Note that, upon registration with gateway/controller 142, the location of mobile device 106 is updated so that all communications will be sent to mobile device 106 in WLAN 102 via gateway/controller 142.

While connected with gateway/controller 142, mobile device 106 receives a message having a discontinuous transmission (DTX) indication from gateway/controller 142 (step 308 of FIG. 3). The DTX indication may be defined to indicate one of two different instructions or preferences: (1) that the mobile device is to perform the DTX functions for the communication of voice data during a voice communication session (e.g. a bit indication='1'), or (2) that the mobile device is to refrain from performing the DTX functions for the communication of voice data during a voice communication session (e.g. the bit indication='0'). In particular, the DTX indication may indicate whether gateway/controller 142 instructs or supports DTX functionality.

Preferably, the message in step 308 is a received from gateway/controller 142 during the registration procedure with mobile device 106. The message having the DTX indication may be, for example, a registration acceptance message, such as Generic Access Resource Control (GA-RC) REGISTER ACCEPT message that is produced and sent from gateway/controller 142 in response to receiving a GA-RC REGISTER REQUEST message from mobile device 106. Specifically, the DTX indication may be part of a GAN Cell Description in an Information Element (IE) in a GA-RC REGISTER ACCEPT message. The message may also be a GA-RC REGISTER UPDATE DOWNLINK message which is produced and sent from gateway/controller 142, so that the DTX indication may be updated by gateway/controller 142 at any suitable time.

While registered with gateway/controller 142 and/or PLMN 104, mobile device 106 performs monitoring to identify whether an incoming/outgoing voice call is requested (step 310 of FIG. 3). To identify whether an incoming voice call from a calling terminal (not shown in FIG. 4) is requested, mobile device 106 monitors its WLAN radio interface 122 to receive a page message for a voice call. To identify whether an outgoing voice call to a called terminal (not shown in FIG. 4) is requested, mobile device 106 monitors its user interface (see e.g. keyboard 232 and/or display 222 of FIG. 2) for a user input indicating a request to place a voice call by the end user. For an outgoing voice call, mobile device 106 typically receives an identification of the called terminal which is selected by the end user via the user interface. If a voice call is not requested as identified in step 310 of FIG. 3, mobile device 106 continues to monitor for any voice call requests.

If a voice call is requested as identified in step 310 of FIG. 3, then mobile device 106 proceeds to identify whether DTX functions should be performed during a voice communication session with the called/calling terminal (step 312 of FIG. 3). To do this, mobile device 106 examines the DTX indication from the message previously received in step 308 of FIG. 3. Note that mobile device 106 may alternatively examine an alternative indication which is derived from this DTX indication.

If the DTX indication fails to indicate that DTX functions are instructed or supported by gateway/controller 144 as identified in step 312 of FIG. 3, then mobile device 106 proceeds to cause the voice communication session to be established and maintained with the called/calling terminal (step 316 of FIG. 3) without use of DTX functionality. For the voice session, mobile device 106 causes a connection to be established with gateway/controller 142, as the voice session is provided via core network 136 of PLMN 104. Voice data for the voice session is conveyed between mobile device 106 and the called/calling terminal, via WLAN 102 over a wireless communication link with wireless access point 112, as well as via core network 136 of PLMN 104.

On the other hand, if the DTX indication indicates that DTX functions are indeed instructed or supported by gateway/controller 144 as identified in step 312 of FIG. 3, then mobile device 106 proceeds to activate DTX functions for the voice session (step 314 of FIG. 3) and causes the voice session to be established and maintained with the called/calling terminal (step 316 of FIG. 3) with use of the DTX functions. Again, for the voice session, mobile device 106 causes a connection to be established with gateway/controller 142, as the voice session is provided via core network 136 of PLMN 104. Voice data for the voice session is conveyed between mobile device 106 and the called/calling terminal, via WLAN 102 over a wireless communication link with wireless access point 112, as well as via core network 136 of PLMN 104.

Using DTX, the transmitter of mobile device 106 is often powered down such that the wireless communication link with wireless AP 112 appears inactive or intermittent, in order to save power in mobile device 106. Mobile device 106 may operate to detect, from a voice activity detector, whether voice activity is present at mobile device 106 (i.e. signals received from a microphone; see e.g. microphone 236 of FIG. 2) during the voice session. In response to detecting a lack of voice activity from the voice activity detector, mobile device 106 causes at least a portion of a transmitter (see e.g. transmitter 214 of FIG. 2) of to be powered down during the voice session. In addition, as a vocoder is used by mobile device 106 for coding the voice data of the voice session, mobile device 106 further causes parameters indicative of background acoustic noise to be produced for transmission. Gateway/controller 142 may operate to receive and identify parameters in the communication of the voice data and to produce comfort noise on the receiving end based on the received parameters. Advantageously, although mobile device 106 operates via WLAN 102, mobile device 106 has an opportunity to perform DTX functions via WLAN 102 for reduced power consumption and reduced radio interface.

Figure 5:
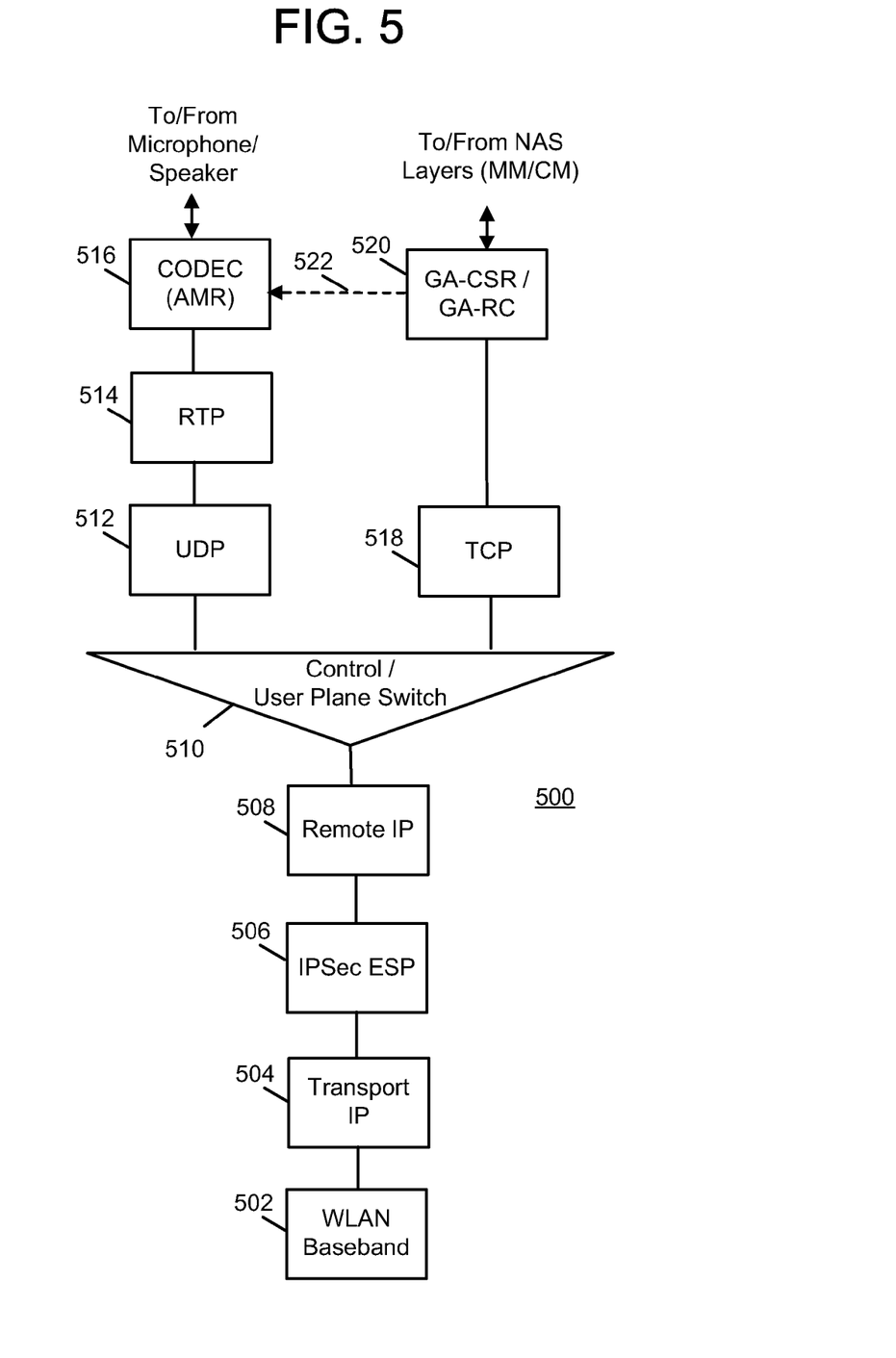
FIG. 5 is a schematic block diagram of components of the mobile device for controlling DTX operations.

FIG. 5 is a schematic block diagram of components 500 of the mobile device for use in controlling DTX operations. This diagram of components 500 relate particularly to a mobile device adapted to operate in accordance with GSM/GPRS-based technologies and IEEE 802.11-based technologies. Note that components 500 may be alternatively referred to as modules or processes. As shown, components 500 of the mobile device include a WLAN baseband process 502, a transport IP process 504, an IPSec ESP process 506, a remote IP process 508, a control/user plane switch process 510, a user datagram protocol (UDP) process 512, a real time transfer protocol (RTP) process 514, a coder/decoder (CODEC) speech process 516 (or vocoder process) of the adaptive multi-rate wideband (AMR) type, a transport control protocol (TCP) process 518, and Generic Access Circuit Switched Resource (GA-CSR)/GA-RC process 520. Other variations of these specific technologies may be provided or supported as well, for example, such as CODECs of the full-rate or half-rate type.

As indicated in FIG. 5, CODEC process 516 processes voice signals/data to/from the speaker/microphone. GA-CSR/GA-RC process 520 processes information to/from Non Access Stratum (NAS) layers. CODEC process 516 is utilized to process speech/voice for WWAN operation (e.g. in the GSM/GPRS or GERAN mode of operation) during a voice call, where DTX functions are controlled by the indication provided via the WWAN (e.g. in the System Information Type 3 or Type 6 message). On the other hand, the same CODEC process 516 is utilized by the mobile device to process speech/voice in the GAN mode of operation during a voice call. In the GAN mode, DTX functions are controlled by an enable or control signal 522 to CODEC process 516 from GA-CSR/GA-RC process 520, which is based on or derived from the DTX indication of the message received from the gateway/controller or GANC. Advantageously, DTX functionality is provided regardless of the mode of operation of the mobile device.

Figure 6:
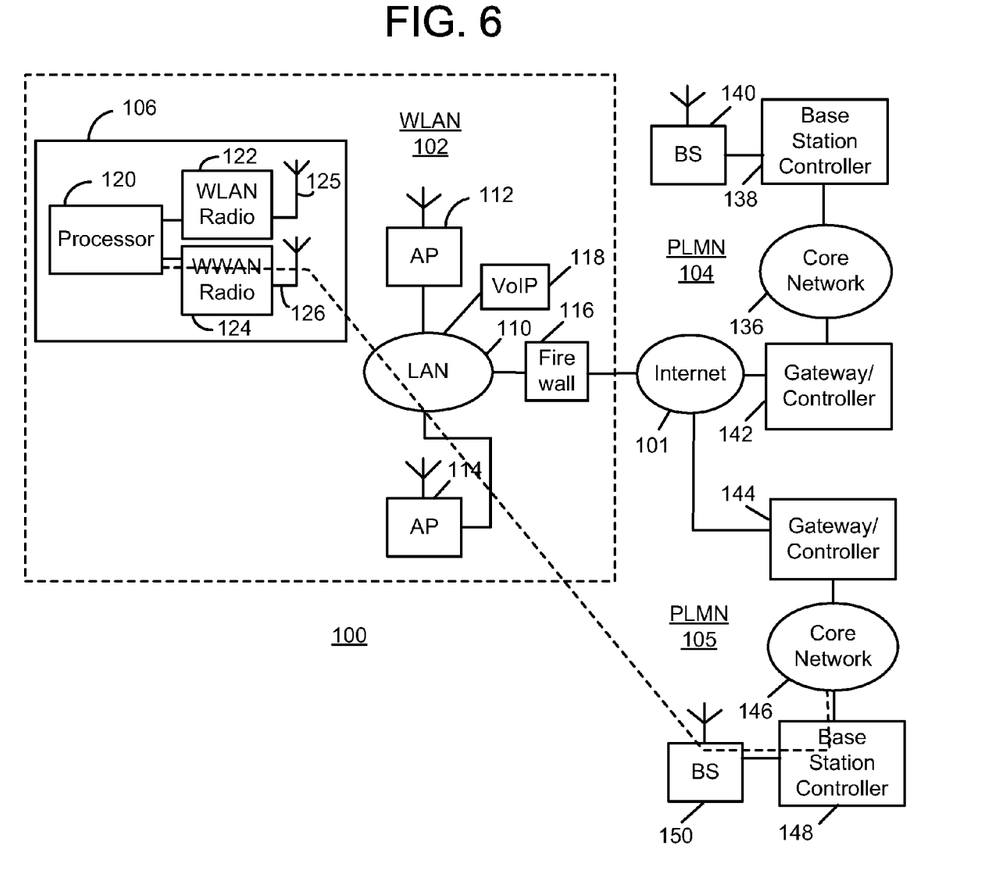
FIG. 6 is an illustration of the communication system from previous FIG. 4, where a connection is established and maintained with the core network of the PLMN via a WWAN radio interface.

Referring now to FIG. 6, where no suitable WLANs or no services via a WLAN are available to mobile device 106, mobile device 106 may operate to send, via WWAN radio interface 124, a registration and connection request for connection and operation with a PLMN via a base station of the PLMN. Such operation may be performed with respect to, for example, PLMN 104 or other PLMNs such as PLMN 105. In FIG. 6, mobile device 106 does not operate through any WLANs but rather registers and operates with PLMN 105 directly through base station 150 of PLMN 105. The services made available by PLMNs 104, 105 may be or include the same or similar communication services available via the WLAN/GAN such as voice, data, electronic mail (e-mail), Web browsing, etc. Prior to such actions, mobile device 106 may perform a scanning operation with use of WWAN radio interface 124 to identify WWANs (PLMNs) available within its coverage region. While operating directly with such PLMN, DTX operations are typically performed by mobile device 106 for uplink communications if commanded so by the network in a System Information Type 3 or Type 6 message (i.e. assuming GSM/GPRS or GERAN operation). For downlink communications, the mobile device is typically required to handle DTX operations at any time, regardless of whether DTX for uplink communications are commanded so by the network (i.e. assuming GSM/GPRS or GERAN operation).

As described, advantageous methods and apparatus for controlling discontinuous transmission operations in a generic access network (GAN) are provided. In one illustrative example, a mobile communication device receives, via the GAN from a GAN controller, a message having a discontinuous transmission (DTX) indication. For a voice communication session, the mobile device causes a connection to be established with the GANC, via the GAN and over a wireless communication link with a wireless access point of the GAN, for the communication of voice data of the voice session which is provided via a core network of a public land mobile network (PLMN). In response to identifying that the DTX indication indicates that the DTX functions are instructed or supported by the GANC, the mobile device causes DTX functions to be performed for the communication of the voice data of the voice session over the wireless link. On the other hand, in response to identifying that the DTX indication fails to indicate that DTX functions are supported or instructed by the GANC, the mobile device refrains from causing the DTX functions to be performed for the communication of the voice data of the voice session over the wireless link. Preferably, the message is a GA-RC REGISTER ACCEPT message or a GA-RC REGISTER UPDATE DOWNLINK message.

For the DTX functions, the mobile device operates to detect, from a voice activity detector, whether voice activity is present during the voice communication session. In response to detecting a lack of voice activity from the voice activity detector, the mobile device causes at least a portion of a wireless transmitter of to be powered down during the voice communication session. In addition, as a vocoder is used by the mobile device for coding the voice data of the voice communication session, the mobile device further causes parameters indicative of background acoustic noise to be provided for transmission. Thus, although the mobile device operates via the GAN, the mobile device has an opportunity to perform DTX functions via the GAN for reduced power consumption and reduced radio interference. Another illustrative example relates to operations at the GAN controller (GANC). The GANC causes a message having a DTX indication to be produced and sent to a mobile communication device via a GAN. The GANC also causes a connection to be established with the mobile communication device, via the GAN and over a wireless communication link between the mobile communication device and a wireless access point of the GAN, for the communication of voice data of a voice communication session for the mobile communication device which is provided via a core network of a PLMN which communicates with the GANC. The DTX indication—may be defined to indicate one of two different instructions or preferences: (1) that the mobile communication device is to perform the DTX functions for the communication of the voice data over the wireless link with the wireless access point, or (2) that the mobile communication is to refrain from performing the DTX functions for the communication of the voice data over the wireless link with the wireless access point. Preferably, the message which carries the DTX indication is a GA-RC REGISTER ACCEPT message or a GA-RC REGISTER UPDATE DOWNLINK message. For DTX, the GANC may operate to receive and identify parameters in the communication of the voice data and to produce comfort noise on the receiving end based on the received parameters.

In a preferred embodiment, the GAN may be a wireless local area network (WLAN) which operates in accordance with IEEE 802.11 standards. Other suitable alternative networks may be utilized. The WLAN may be a Bluetooth-based network, a WiMAX-based network (i.e. IEEE 802.16), or a Ultra-WideBand (UWB)-based network (i.e. IEEE 802.15), as a few examples. WWAN networks may be, for example, a Long-Term Evolution (LTE)-based network or a EVolution-Data Only (EV-DO)-based network. The technique may be embodied in a mobile communication device having one or more processors adapted to execute the technique; a corresponding complementary technique may be embodied in the GANC having one or more processors adapted to execute the complementary technique. The technique may also be embodied in a computer program product having a computer readable medium and computer instructions stored in the computer readable medium, where the one or more processors are operative to execute the computer instructions in accordance with the method.

It is also appreciated that, in a more general approach, a mobile communication device may be adapted to receive, via a wireless access network (e.g. a WLAN), and from a network controller adapted to communicate with the wireless access network over a wide-area IP communication network (e.g. the Internet), a message having a discontinuous transmission indication; cause a connection (e.g. a tunnel connection) to be established with the network controller, via the wireless access network and over the wide-area IP communication network, for the communication of voice data of a voice communication session which is provided via a core network of a wireless service network (e.g. a mobile or cellular telecommunications network) which is adapted to communicate with the network controller; cause discontinuous transmission functions to be performed for the communication of the voice data of the voice communication session over a wireless communication link of the wireless access network in response to identifying that the discontinuous transmission indication indicates that discontinuous transmission functions are instructed or supported; and refrain from causing discontinuous transmission functions to be performed for the communication of the voice data of the voice communication session over the wireless communication link of the wireless access network in response to identifying that the discontinuous transmission indication fails to indicate that discontinuous functions are supported or instructed.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method for use in a mobile communication device for controlling discontinuous transmission operations in a generic access network (GAN), the method comprising the acts of:
    sending, via the GAN, a registration message to a GAN controller (GANC);
    in response to sending the registration message, receiving, via the GAN and from the GANC, a registration acceptance message which includes a discontinuous transmission (DTX) indication;
    after receiving the registration acceptance message, establishing a connection with the GANC, via the GAN and over a wireless communication link with a wireless access point of the GAN, for the communication of voice data of a voice communication session which is provided via a core network of a mobile telecommunications network which communicates with the GANC;
    performing DTX functions during the voice communication session for the communication of the voice data over the wireless communication link of the GAN in response to identifying that the DTX indication of the registration acceptance message indicates that DTX functions are instructed or supported; and
    refraining from performing the DTX functions during the voice communication session for the communication of the voice data over the wireless communication link in response to identifying that the DTX indication of the registration acceptance message indicates that DTX functions are not instructed or supported.

2. The method of claim 1, wherein the GAN comprises a wireless local area network (WLAN) operative in accordance with IEEE 802.11 standards, and the mobile telecommunications network comprises a cellular telecommunications network.

3. The method of claim 1, wherein the GAN comprises a wireless local area network (WLAN) operative in accordance with IEEE 802.11 standards.

4. The method of claim 1, wherein the DTX indication in the registration acceptance message is defined as having a first setting and a second setting, the first setting being defined to indicate that the mobile communication device is to Perform DTX functions for the communication of the voice data during the voice communication session, and the second setting being defined to indicate that the mobile communication device is to refrain from performing the DTX functions for the communication of the voice data during the voice communication session.

5. The method of claim 1, wherein the DTX indication is part of a GAN Cell Description in an Information Element (IE) in a Generic Access Resource Control (GA-RC) REGISTER ACCEPT MESSAGE.

6. The method of claim 1, wherein the registration acceptance message is one of a Generic Access Resource Control (GA-RC) REGISTER ACCEPT message or a GA-RC REGISTER UPDATE DOWNLINK message.

7. The method of claim 1, wherein the DTX functions comprise:
    detecting, from a voice activity detector, whether voice activity is present during the voice communication session; and
    causing at least a portion of a wireless transmitter of to be powered down during the voice communication session in response to detecting a lack of voice activity from the voice activity detector.

8. The method of claim 1, further comprising:
coding the voice data of the voice communication with use of a vocoder;
wherein the DTX functions comprise:
detecting, from a voice activity detector, whether voice activity is present at the mobile communication device during the voice communication session; and
producing parameters indicative of background acoustic noise for transmission.

9. The method of claim 1, being embodied as computer instructions stored in a non-transitory computer readable medium for execution by one or more processors of the mobile communication device.

10. A mobile communication device comprising:
one or more processors;
a generic access network (GAN) interface configured to communicate with a GAN;
a wireless wide area network (WWAN) interface configured to communicate with a mobile telecommunications network;
the one or more processors being configured to:
send, via the GAN, a registration message to a GAN controller (GANC);
in response to sending the registration message, receive, via the GAN and from the GANC, a registration acceptance message which includes a discontinuous transmission (DTX) indication;
after receiving the registration acceptance message, establish a connection with the GANC, via the GAN and over a wireless communication link with a wireless access point of the GAN, for the communication of voice data of a voice communication session which is provided via a core network of the mobile telecommunications network which communicates with the GANC;
perform DTX functions during the voice communication session for the communication of the voice data over the wireless communication link of the GAN in response to identifying that the DTX indication of the registration acceptance message indicates that DTX functions are instructed or supported; and
refrain from performing DTX operations during the voice communication session for the communication of the voice data over the wireless communication link in response to identifying that the DTX indication of the registration acceptance message indicates that DTX functions are not supported or instructed.

11. The mobile communication device of claim 10, wherein the GAN comprises a wireless local area network (WLAN) operative in accordance with IEEE 802.11 standards, and the mobile telecommunications network comprises a cellular telecommunications network.

12. The mobile communication device of claim 10, wherein the GAN comprises a wireless local area network (WLAN) operative in accordance with IEEE 802.11 standards.

13. The mobile communication device of claim 10, wherein the
DTX indication in the registration acceptance message is defined as having a first setting and a second setting, the first setting being defined to indicate that the mobile communication device is to perform DTX functions for the communication of the voice data during the voice communication session, and the second setting being defined to indicate that the mobile communication device is to refrain from performing the DTX functions for the communication of the voice data during the voice communication session.

14. The mobile communication device of claim 10, wherein the one or more processors are further configured to operate in a GAN mode of operation for the receiving of the message, the establishing of the connection, and the performing of the DTX functions, and further configured to perform the following acts while operating in a WWAN mode of operation:
receive, via the WWAN interface from the WWAN, a message having a DTX indication;
establish a connection, over a wireless communication link with the WWAN, for the communication of voice data of a voice communication session; and
perform DTX functions for the communication of the voice data during the voice communication session over the wireless communication link in response to identifying that the DTX indication of the message indicates that DTX functions are instructed or supported by the WWAN.

15. The mobile communication device of claim 10, wherein the registration acceptance message is one of a Generic Access Resource Control (GA-RC) REGISTER ACCEPT message or a GA-RC REGISTER UPDATE DOWNLINK message.

16. The mobile communication device of claim 10, wherein the one or more processors are further configured to execute the DTX function by:
identifying, from a voice activity detector during the voice communication session, whether voice activity is present at the mobile communication device; and
causing at least a portion of a wireless transmitter of the mobile communication device to be powered down during the voice communication session in response to identifying a lack of voice activity being present at the mobile communication device.

17. The mobile communication device of claim 10, wherein the one or more processors are further configured to:
code the voice data of the voice communication with use of a vocoder;
execute the DTX functions by:
detecting, from a voice activity detector, whether voice activity is present at the mobile communication device during the voice communication session; and
producing parameters indicative of background acoustic noise at the mobile communication device for transmission.

18. A method for use in a generic access network controller (GANC) for controlling discontinuous transmission operations, the method comprising the acts of:
receiving, via a generic access network (GAN), a registration message from a mobile communication device operating in the GAN;
in response to receiving the registration message, producing and sending, via the GAN and to the mobile communication device, a registration acceptance message which includes a discontinuous transmission (DTX) indication;

after sending the registration acceptance message, establishing a connection with the mobile communication device, via the GAN and over a wireless communication link between the mobile communication device and a wireless access point of the GAN, for the communication of voice data of a voice communication session which is provided via a core network of a mobile telecommunications network which communicates with the GANC; and wherein the DTX indication in the registration acceptance message is defined as having a first setting and a second setting, the first setting being defined to indicate that the mobile communication device is to perform DTX functions during the voice communication session for the communication of the voice data, and the second setting being defined to indicate that the mobile communication device is to refrain from performing the DTX functions during the voice communication session for the communication of the voice data.

19. The method of claim 18, wherein the mobile telecommunications network comprises a cellular telecommunications network.

20. The method of claim 18, wherein the GAN comprises a wireless local area network (WLAN) operative in accordance with IEEE 802.11 standards.

21. The method of claim 18, wherein the registration acceptance message is one of a Generic Access Resource Control (GA-RC) REGISTER ACCEPT message or a GA-RC REGISTER UPDATE DOWNLINK message.

22. The method of claim 18, being embodied as computer instructions stored in a non-transitory computer readable medium for execution by one or more processors of the GANC.

23. A generic access network controller (GANC), comprising:

one or more processors;

the one or more processors being configured to:
receive, via a generic access network (GAN), a registration message from a mobile communication device operating in the GAN;
in response to receiving the registration message, produce and send, via the GAN and to the mobile communication device, a registration acceptance message which includes a discontinuous transmission (DTX) indication;
after sending the registration acceptance message, establish a connection with the mobile communication device, via the GAN and over a wireless communication link between the mobile communication device and a wireless access point of the GAN, for the communication of voice data of a voice communication session for the mobile communication device which is provided via a core network of a mobile telecommunications network which communicates with the GANC; and
wherein the DTX indication in the registration acceptance message is defined as having a first setting and a second setting, the first setting being defined to indicate that the mobile communication device is to perform DTX functions during the voice communication session for the communication of the voice data, and the second setting being defined to indicate that the mobile communication device is to refrain from performing the DTX functions during the voice communication session for the communication of the voice data.

24. The GANC of claim 23, wherein the GAN comprises a wireless local area network operative in accordance with IEEE 802.11.

* * * * *